United States Patent
Arad (10) Patent No.: US 7,991,926 B1
(45) Date of Patent: Aug. 2, 2011

(54) SCALABLE MEMORY ARCHITECTURE FOR HIGH SPEED CROSSBARS USING VARIABLE CELL OR PACKET LENGTH

(75) Inventor: Carmi Arad, Nofit (IL)

(73) Assignee: Marvell Israel (M.I.S.L) Ltd. (IL)

( * ) Notice: Subject to any disclaimer, the term of this patent is extended or adjusted under 35 U.S.C. 154(b) by 1097 days.

(21) Appl. No.: 11/398,443

(22) Filed: Apr. 4, 2006

Related U.S. Application Data (60) Provisional application No. 60/776,027, filed on Feb. 22, 2006.

(51) Int. Cl.
G06F 13/00 (2006.01)
H04J 3/00 (2006.01)

(52) U.S. Cl. .......................... 710/52; 370/413; 370/386
(58) Field of Classification Search ..................... 710/52
See application file for complete search history.

(56) References Cited

U.S. PATENT DOCUMENTS

| | | | | |
|---|---|---|---|---|
| 5,361,255 A | * | 11/1994 | Diaz et al. | 370/374 |
| 5,623,698 A | * | 4/1997 | Stephenson et al. | 710/38 |
| 5,953,318 A | * | 9/1999 | Nattkemper et al. | 370/236 |
| 6,351,466 B1 | * | 2/2002 | Prabhakar et al. | 370/413 |
| 6,487,171 B1 | * | 11/2002 | Honig et al. | 370/235 |
| 6,563,837 B2 | * | 5/2003 | Krishna et al. | 370/413 |
| 6,574,232 B1 | * | 6/2003 | Honig et al. | 370/413 |
| 6,611,879 B1 | * | 8/2003 | Dobecki | 710/1 |
| 6,687,246 B1 | * | 2/2004 | Wolrich et al. | 370/388 |
| 6,724,759 B1 | * | 4/2004 | Chang et al. | 370/389 |
| 6,804,731 B1 | * | 10/2004 | Chang et al. | 710/53 |
| 6,907,001 B1 | * | 6/2005 | Nakayama et al. | 370/230 |
| 7,058,751 B2 | * | 6/2006 | Kawarai et al. | 710/317 |
| 7,123,623 B2 | * | 10/2006 | Sharma et al. | 370/413 |
| 7,154,885 B2 | * | 12/2006 | Nong | 370/380 |
| 7,167,480 B1 | * | 1/2007 | Somashekhar | 370/413 |
| 7,206,325 B2 | * | 4/2007 | Nong | 370/474 |
| 7,212,525 B2 | * | 5/2007 | Moriwaki et al. | 370/386 |
| 7,254,139 B2 | * | 8/2007 | Benayoun et al. | 370/413 |
| 7,283,520 B1 | * | 10/2007 | Liao et al. | 370/357 |
| 7,397,808 B2 | * | 7/2008 | Lee et al. | 370/413 |
| 7,454,536 B1 | * | 11/2008 | Walton et al. | 710/52 |
| 7,467,238 B2 | * | 12/2008 | Hosoya et al. | 710/22 |
| 7,477,639 B2 | * | 1/2009 | Shimizu et al. | 370/389 |
| 7,602,720 B2 | * | 10/2009 | Bergamasco et al. | 370/235 |
| 7,852,829 B2 | * | 12/2010 | Chao et al. | 370/352 |
| 2004/0090964 A1 | * | 5/2004 | Reed et al. | 370/395.4 |
| 2004/0165887 A1 | * | 8/2004 | Beshai | 398/42 |

(Continued)

OTHER PUBLICATIONS

Denzel et al., "A Highly Modular Packet Switch for GB/S Rates." IBM Research Division, Zurich Research Laboratory, 8803 Ruschlikon, Switzerland, International Switching Symposium, Oct. 25-30, 1992, pp. 236-240.*

(Continued)

*Primary Examiner* — Cheng-Yuan Tseng (57) ABSTRACT

Packets or cells of variable lengths arriving at a multitude of input ports of a crossbar switch are stored in the input buffers associated with the input ports. Each input buffer includes a number of banks defined by a ratio of a preselected size to the smallest packet size. Each bank is configured to store a packet having the smallest size. The packets so stored in the buffers are subsequently transferred and stored in a memory shared by all the input and output buffers. The packets are stored along the depth of the shared memory, therefore, during each packet transmission period, a portion of each one of the packets is transferred and stored in the same addressable storage location of the share memory. Each portion includes one or more bits carried by the packet.

12 Claims, 5 Drawing Sheets

U.S. PATENT DOCUMENTS

2005/0285938 A1* 12/2005 Suzuki et al. .................. 348/148
2006/0039370 A1*  2/2006 Rosen et al. .................. 370/389
2006/0120379 A1*  6/2006 Beshai ....................... 370/395.4
2006/0221945 A1* 10/2006 Chin et al. .................... 370/381
2006/0256793 A1* 11/2006 Swartzentruber et al. .... 370/394

OTHER PUBLICATIONS

MS Knowledge Base, "The Default Cluster Size for the NTFS and FAT File Systems", originally published under Q314878, Microsoft, Jan. 31, 2002. http://support.microsoft.com/kb/314878.*

Stallings, William. "Computer Organization and Architecture: Designing for Performance". 2000. Prentice Hall. 5th Edition, pp. 208-209.*

Denzel et al., "A Highly Modular Packet Switch for GB/S Rates," IBM Research Division, Zurich Research Laboratory, 8803 Ruschlikon, Switzerland, International Switching Symposium, Oct. 25-30, 1992, pp. 236-240.

Denzel, W.E. et al., "A Highly Modular Packet Switch for GB/S Rates," ISS 2:236-240 (1992).

* cited by examiner

FIG. 1

*(Prior Art)*

FIG. 2

*(Prior Art)*

FIG. 3

(Prior Art)

SCALABLE MEMORY ARCHITECTURE FOR HIGH SPEED CROSSBARS USING VARIABLE CELL OR PACKET LENGTH

CROSS-REFERENCE TO RELATED APPLICATIONS

The present application claims benefit under 35 USC 119 (e) of U.S. provisional application No. 60/776,027, filed Feb. 22, 2006, entitled "Scalable Memory Architecture For High Speed Crossbars Using Variable Cell Length", the content of which is incorporated herein by reference in its entirety.

BACKGROUND OF THE INVENTION

The present invention relates to computer network devices, and more particularly to memories used in crossbar and other packet switches.

Figure 1:
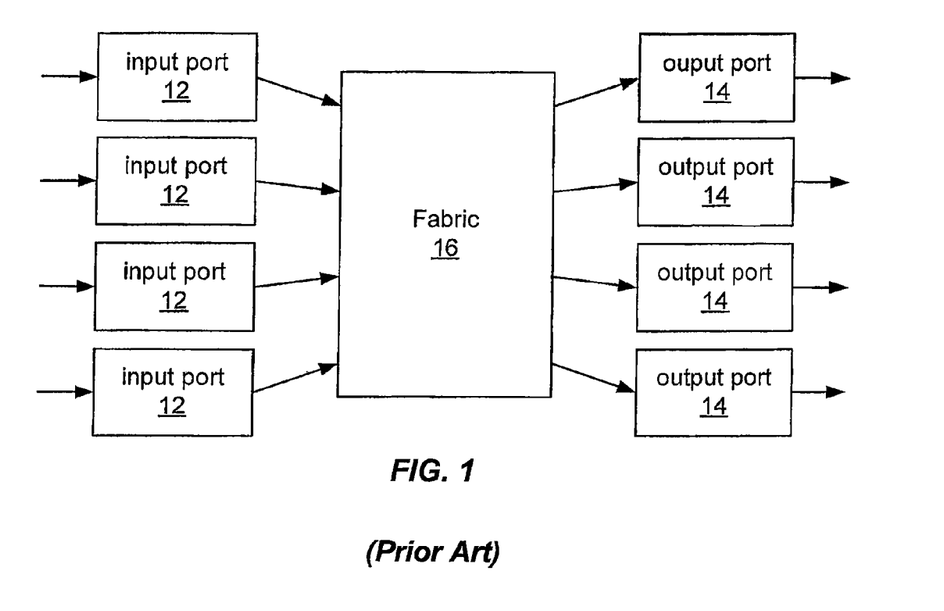
FIG. 1 is a block diagram of a packet switch, as known in the prior art.

Packet switches are well known and widely used to route packets from one host to another. A packet switch, such as packet switch 10 shown in FIG. 1, includes a multitude of input (ingress) ports 12, a multitude of output (egress) ports 14, and a switch fabric 16. Each packet is received via one of the input ports 12 and forwarded to one or more of the output ports 14 based on the packet's forwarding address information. During each packet time, each one of the input ports is in communication with one or more of the output ports. Contention occurs if the arrival rate of the packets destined for any of the output ports exceeds the capacity of that output port to receive them.

Figure 2:
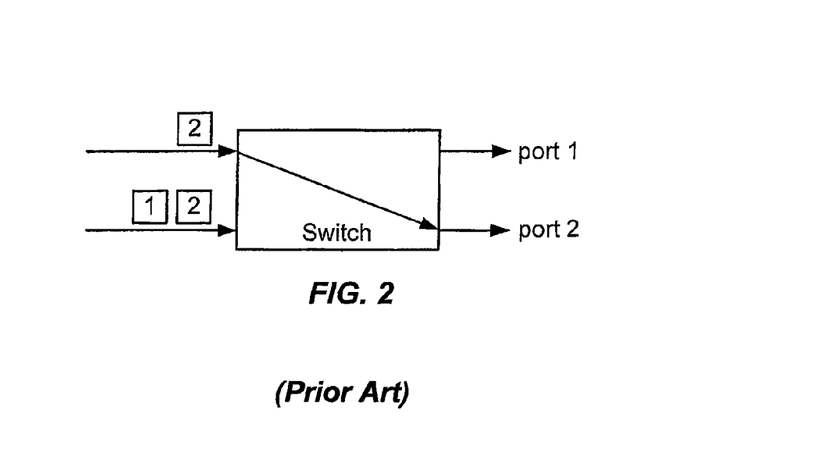
FIG. 2 shows a packet destined for one of the output ports and being blocked by a packet destined for another output port, as known in the prior art.

To prevent packet loss, a switch packet must include queues. The queues may be located at the switch input ports in accordance with the input queuing technique, or at the switch output ports in accordance with the output queuing technique. In switches using the input queuing technique, incoming packets are stored in the input queues as they arrive. The packets at the top (front) of the queues are thereafter forwarded to their destination output ports. If the packets at the front of several different input ports are destined for the same output port at the same time, then only one of them can be forwarded. Packets not forwarded to their destination remain in the queue and may potentially block other packets from reaching their destination. This effect is commonly known as head-of-line blocking. For example, in FIG. 2, a packet destined for port 1 is shown as being blocked by a packet contending for port 2.

One known method for overcoming the head-of-line blocking is to use output queuing. In one implementation of the output queuing, an egress queue is dedicated to every source port in every output. Incoming cells are forwarded through the switch and queued at the egress ports. In the output queuing technique, the bandwidth of the memory at every output increases linearly with the number of input ports. However, the number of memory instances at the output grows at least as fast as $n^2$, where n is the number of input/output ports. Because of this $n^2$ relationship, this technique is not scalable as the number of ports increases.

Figure 3:
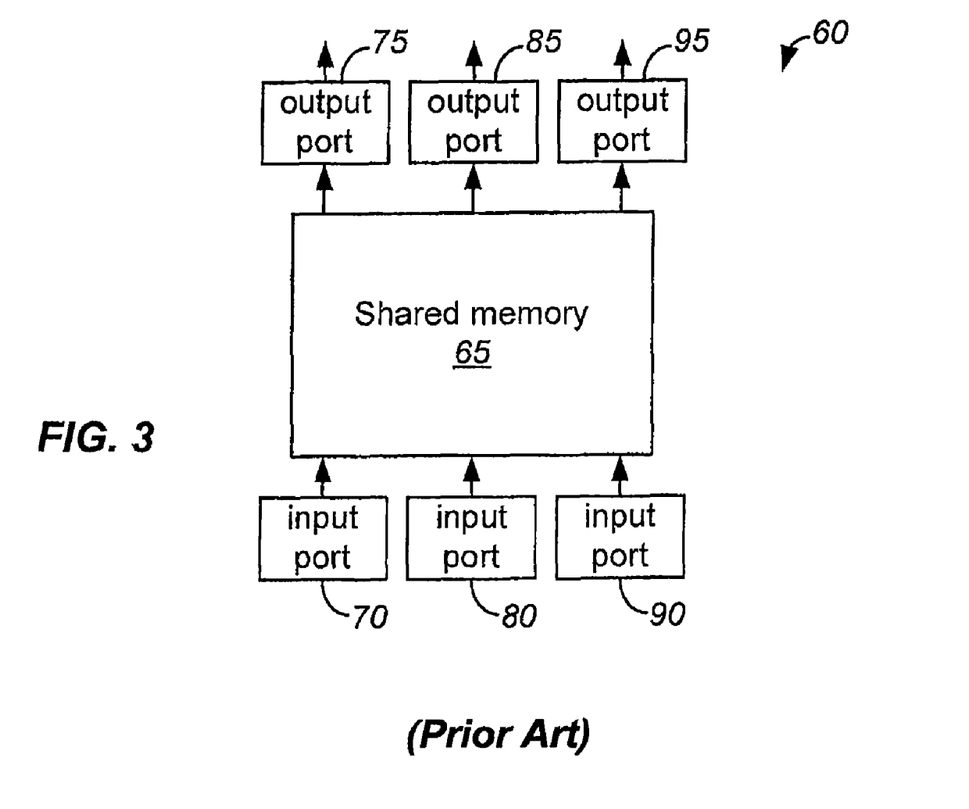
FIG. 3 shows a crossbar switch having a shared memory disposed between the input and output ports, as known in the prior art.

FIG. 3 shows a crossbar switch having three output ports 75, 85, 95, three input ports 70, 80, 50, and a shared memory 65. During each cell time, shared memory 65 receives and stores data from the three input ports 70, 80, 50, and supplies data to the output ports 75, 85, 95. Therefore, shared memory 65 is required to support a bandwidth six times the aggregate bandwidth of each of the input/output ports. For example, if each of the input/output ports is a 10 gigabit/second port, shared memory 65 is required to have a bandwidth of 60 gigabit/second. Supporting such high bandwidths as the number of ports increases poses a number of difficult challenges.

Figure 4:
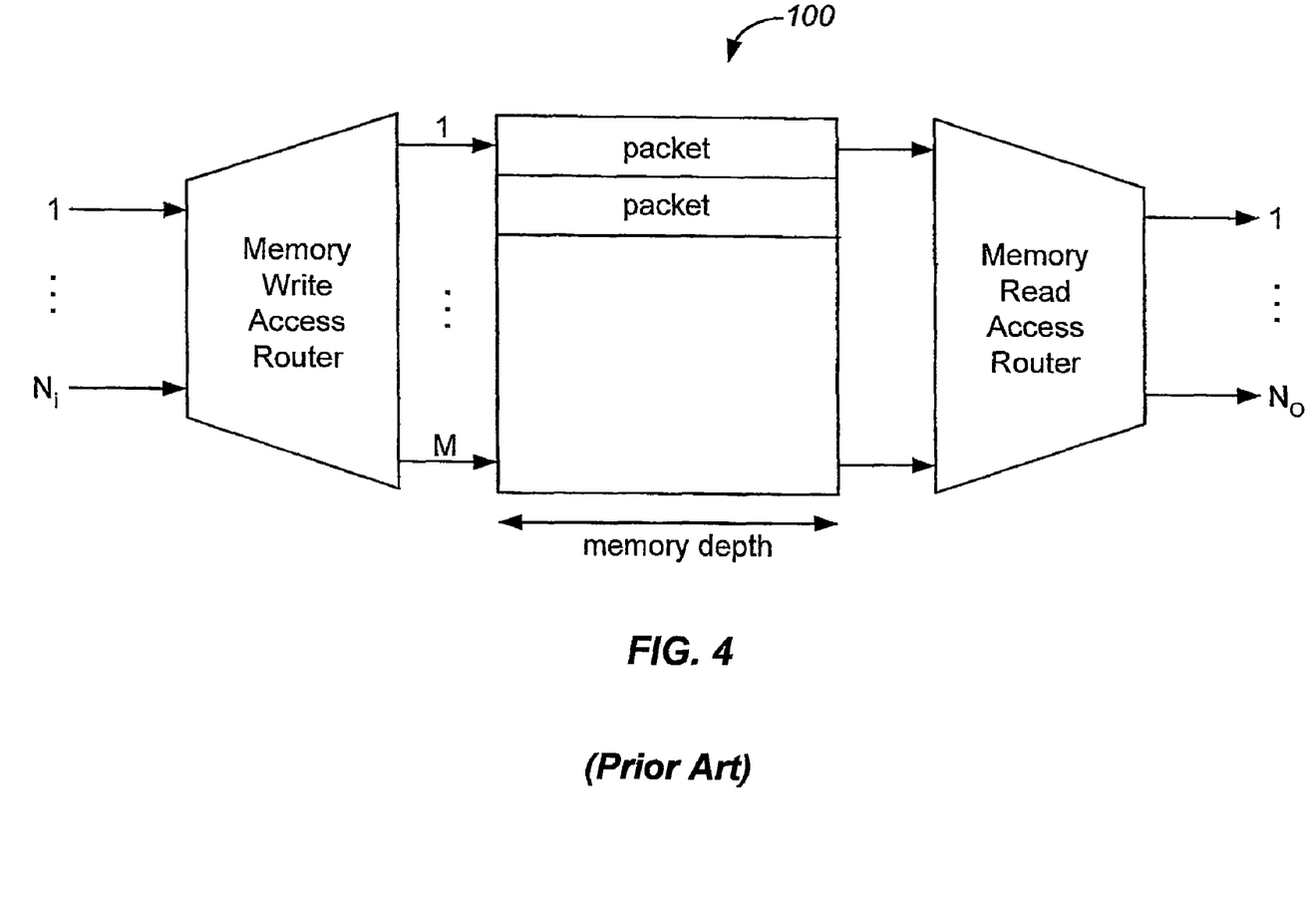
FIG. 4 is a block diagram of a high-bandwidth memory shared by input and output ports of a crossbar switch, as known in the prior art.

In an article entitled "A Highly Modular Packet Switch For GB/Rates", by W. E. Denzel, A. P. J. Engbersen, I. Iliadis, an, and G. Karlsson, IBM Research Division, Zurich Research Laboratory, 8803 Ruschlikon, Switzerland, International Switching Symposium, Oct. 25-30, 1992, pp. 236-240, authors Denzel et al. described a new memory architecture for a broadband switching device. FIG. 4 is a block diagram of a cell memory 100 described by Denzel et al. In the following, it is understood that the terms packets and cells may be collectively and interchangeably referred to as packets. Cell memory 100 has a memory width defined by the following:

$$M \times P_{rate} \times T_{acc} \times 2$$

where M represents the number of cells that the memory can store at any given time, $P_{rate}$ represents the port rate, and $T_{acc}$ represents the memory access time. The product of M, $P_{rate}$, and $T_{acc}$ is multiplied by 2 to account for the fact that during each clock cycle, the memory is accessed to perform both a read operation and a write operation. For example, assuming that the port rate is 10 Gb/sec, the memory access time is 2.5 nsec, and the memory is adapted to store 1000 cells at any given time, the memory is 50000 bits wide. The memory depth is defined by the cell length as well as the following:

$$P_{rate} \times T_{acc} \times 2$$

For example, assuming that each cell has a length of 100 bytes, and that each addressable memory location is configured to store 50 bits for each cell, the memory depth is (100×8/50)=16. In other words, for the above example, the memory has 16 addressable locations.

Referring to FIG. 4, packets (cells) arriving at the input ports are routed through 1-to-M routers into the cell memory 100. These routers are 1-to-M demultiplexers each responsible for transferring the packet arriving at its input into an empty storage location. Thus all $N_i$ routers can transfer a packet to a storage location at any given time. Packets leaving the switch are routed from the memory through M-to-1 selectors to the output ports. There is a selector for each of the $N_o$ output ports. These selectors constitute M-to-1 multiplexers which route packets from the proper storage locations to the designated output ports. Accordingly, each packet is stored across the memory depth occupying, e.g., only one bit of each memory word. The memory organization shown in FIG. 4 is adapted to support packets having a fixed size. A need continues to exist for a memory organization that has high-aggregate throughput and that is adapted to handle packet or cell sizes of varying lengths.

BRIEF SUMMARY OF THE INVENTION

In accordance with one embodiment of the present invention, during each packet or cell transmission period, packets or cells of variable lengths and arriving at a multitude of input ports of a crossbar switch are stored in the input buffers associated with the input ports. The following description of the present invention is provided with reference to packets. It is understood, however, that the present invention also applies to cells and that the terms packets and cells may be used herein interchangeably. Each input buffer includes a fixed number of banks defined, in part, by a ratio of a preselected buffer size P to the smallest packet size. Accordingly, each bank is configured to store a packet having the smallest size or a segment of a packet having a size equal to that of the smallest packet. The packets so stored in the buffers are subsequently transferred and stored in a memory accessible and shared by all the input buffers. The packets are stored along the depth of the shared memory, therefore, during each packet transmission period, a subsegment of each one of the packets is transferred and stored in the same addressable storage location of the share memory. Each subsegment may be a bit or a group of bits carried by the packet.

In such embodiments, the crossbar switch includes a multitude of output buffers each associated with a different one of the output ports and each having a multitude of banks. During each packet transmission period, the packet subsegments destined for the same output port are retrieved from the shared memory and stored in the bank(s) associated with that output port. In some embodiments, the input buffers have the same storage size. Each of the banks of each input buffer optionally has the same storage size. Furthermore, in some embodiments, all the output buffers have the same storage size and each of the banks of each output buffer has a storage size equal to that of the input buffer banks. In some embodiments, the packet segments have a size equal to the size of the input/output buffer banks in which they are stored.

At each input port, the write operations to the input port's associated buffer are carried out at the same rate as the input port rate, and the read operations from this buffer are performed at N times the input port rate, where N is the ratio of P to the smallest packet size. At each output port, the read operations from the output port's associated buffer is carried out at the same rate as the output port rate, and the write operations to this buffer are performed at N times the output port rate. In one embodiment, the number of banks disposed in each of the output buffers is N+1, and the number of banks disposed in each of the input buffers is 2N+1. The extra N banks that are provided at each input port relative to each output port is used to provide for alignment of the packets coming from different ports.

In accordance with another embodiment of the present invention, a crossbar switch includes means for storing each segment of a first received packet in one of the banks of a first input buffer during a first time period. The number of banks of the first input buffer is defined, in part, by a ratio N of a preselected buffer size P to a smallest packet size. Such embodiments also include means for storing each segment of a second received packet in one of the banks of the second input buffer during the same time period. Such embodiments also include means for storing, during a second time period, corresponding subsegments of each of the first and second packets in the same addressable storage location of a memory until all subsegments of each of the first and second packets are stored in the memory. The second time period is equal to the first time period.

Such embodiments include means for transferring a third packet from the memory to a first output buffer, means for transferring a fourth packet from the memory to a second output buffer, means for storing the transferred third packet in one or more banks of the first output buffer; and means for storing the transferred fourth packet in one or more banks of the second output buffer. Such embodiments may further include means for providing the same storage space in each of the first and second input buffers, and means for providing the same storage space in each of the banks of the first and second input buffer. Such embodiments may further include means for providing the same storage space in each of the first and second output buffers, and means for providing the same storage space in each of the banks of the first and second output buffers. Such embodiments may further include means for providing input and output buffer banks equal to the size of the packets segment they store.

In accordance with another embodiment of the present invention, a crossbar switch includes code for storing each segment of a first received packet in one of the banks of a first input buffer during a first time period. The number of banks of the first input buffer is defined, in part, by a ratio N of a preselected buffer size P to a smallest packet size. Such embodiments also include code for storing each segment of a second received packet in one of the banks of the second input buffer during the same time period. Such embodiments also include code for storing, during a second time period, corresponding subsegments of each of the first and second packets in the same addressable storage location of a memory until all subsegments of each of the first and second packets are stored in the memory. The second time period is equal to the first time period.

Such embodiments include code for transferring a third packet from the memory to a first output buffer, code for transferring a fourth packet from the memory to a second output buffer, code for storing the transferred third packet in one or more banks of the first output buffer; and code for storing the transferred fourth packet in one or more banks of the second output buffer. Such embodiments may further include code for providing the same storage space in each of the first and second input buffers, and code for providing the same storage space in each of the banks of the first and second input buffer. Such embodiments may further include code for providing the same storage space in each of the first and second output buffers, and code for providing the same storage space in each of the banks of the first and second output buffers. Such embodiments may further include code for providing input and output buffer banks equal to the size of the packets segment they store.

In accordance with another embodiment of the present invention, a method of switching packets includes, in part, storing each segment of a first received packet in a different one of the banks of a first input buffer; storing each segment of a second received packet in a different one of the banks of a second input buffer, and storing corresponding subsegments of each of the first and second packets in the same addressable storage location of a memory until all subsegments of each of the first and second packets are stored in the memory. The number of banks in the input buffers is determined, in part, by the ratio of a preselected buffer size P to a smallest packet size.

The method further includes, transferring a third packet from the memory to a first output buffer, transferring a fourth packet from the memory to a second output buffer, storing the transferred third packet in one or more banks of the first output buffer, and storing the transferred fourth packet in one or more banks of the second output buffer. The method further includes providing the same storage space in each of the first and second input buffers, and providing the same storage space in each of the banks of the first and second input buffers. The method further includes providing the same storage space in each of the first and second output buffers, and providing the same storage space in each of the banks of the first and second output buffers. Each packet segment has a size equal to the size of the input or output buffer bank in which it is stored.

DETAILED DESCRIPTION OF THE INVENTION

Figure 5:
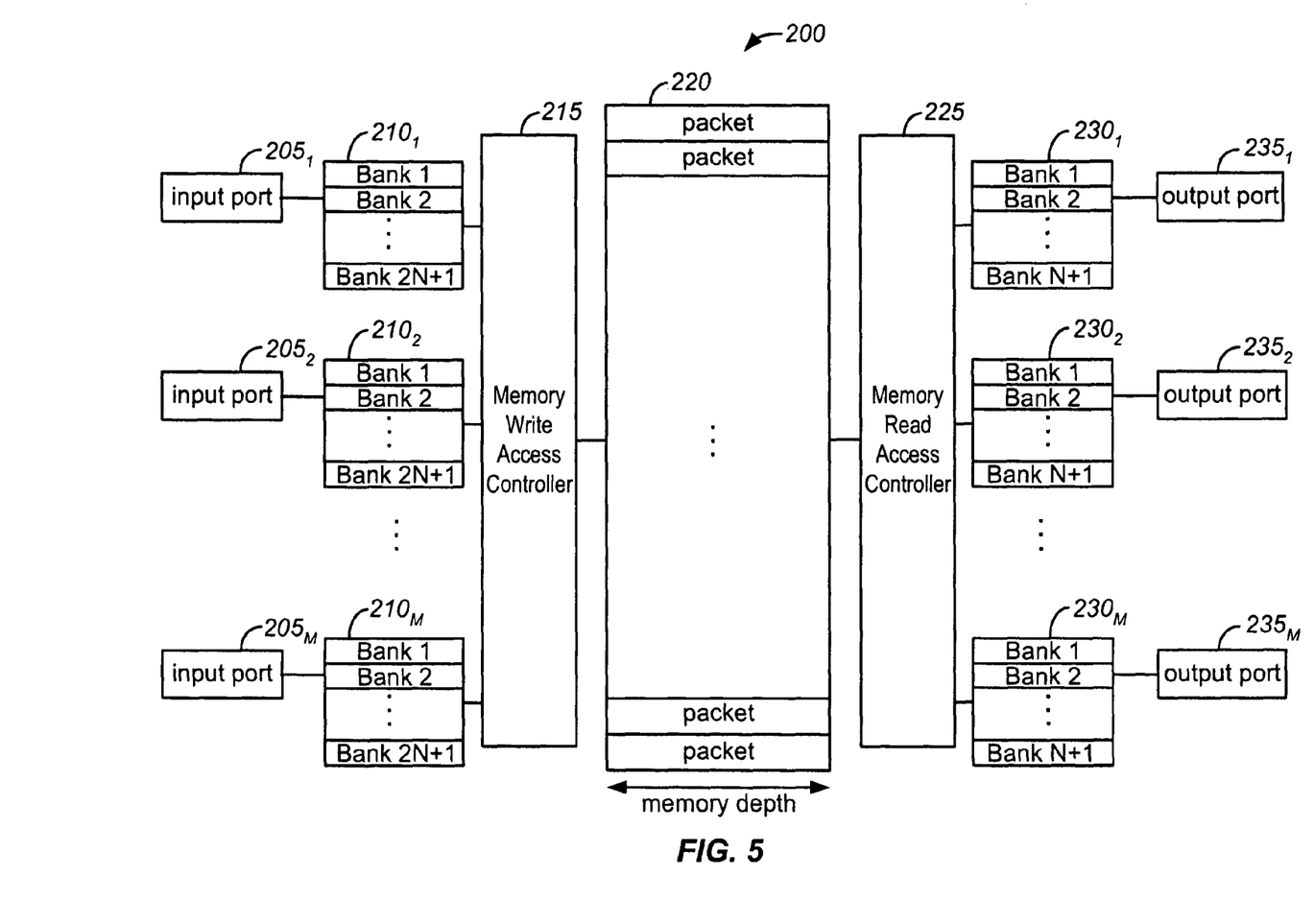
FIG. 5 is a block diagram of a packet switch, in accordance with one embodiment of the present invention.

A crossbar switch 200, in accordance with one embodiment of the present invention, includes, in part, M input ports 205, M input buffers 210 each associated with a different one of the input ports, a memory write access controller 215, a shared memory 220, a memory read access controller 225, M output ports 235, and M output buffers 230 each associated with a different one of the output ports, as shown in FIG. 5. In the following, different instances of similar components are alternatively identified by similar reference numerals having different indices—the indices appear as subscripts to the reference numerals. For example, the M instances of input ports $205_i$, where i is an integer varying from 1 to M, are alternatively identified as $205_1$, $205_2$ and $205_M$. Similarly, for example, the M instances of input buffers 210 are alternatively identified as $210_1$, $210_2$ ... $210_M$.

In one embodiment, such as that shown in FIG. 5, each of the input buffers $210_i$ includes (2N+1) banks, where N is an integer defined by the ratio of a preselected buffer size P to the smallest packet received by crossbar switch 200. For example, if N is equal to 6, each input buffer $210_i$ is partitioned into 13 equal banks each bank having the size configured to store the smallest packet. The input and output buffers $210_i$ and $230_i$, in accordance with the present invention, enable packets having variable lengths to be synchronized before being stored in and retrieved from memory 220. In one embodiment, each of the output buffers $230_i$ includes (N+1) banks. Accordingly, in such embodiments, if N is equal to 6, each output buffer $230_i$ is partitioned into 7 equal banks each bank having the size configured to store the smallest packet. The extra N banks that are provided at each input port relative to each output port is used to provide for alignment of the packets coming from different ports. The following description of the present invention is provided with reference to packets. It is understood, however, that the present invention also applies to cells and that the terms packets and cells may be used herein interchangeably.

During any given packet (cell) time, each input port $205_i$ stores parts or an entire incoming packet in its associated input buffer $210_i$. For example, a packet received via port $205_1$ is stored in input buffer $210_1$, and a packet received via port $205_M$ is stored in input buffer $210_M$. Each received packet is stored in one or more banks of its associated input buffer, depending on the size of the packet. Assume that the ratio of the preselected buffer size P to the smallest packet is 6 (i.e., N is 6), accordingly, each input buffer 210 is partitioned into 13 equal banks each bank configured to store the smallest packet. Assume that the packet received by port $205_1$ is 3 times the smallest packet; accordingly, this packet is stored in banks 1, 2 and 3 of input buffer $210_1$, with each bank storing ⅓ of the packet. Assume that a packet received by port $205_2$ is, for example, the smallest packet; accordingly, this packet is stored only in bank 1 of input buffer $210_1$.

During each given cell time, memory write access controller 215 transfers data previously stored in the input buffers $210_i$ to shared memory 220. The entire content of each input buffer $210_i$ is stored in memory 220 during each cell time. For example, assume that input buffer $210_1$ has stored in its banks number 1 and 2, two equal segments of a packet having a size that is twice the smallest packet. Further assume that input buffer $210_4$ has stored in its banks number 1, 2, and 3, three equal segments of a packet having a size that is thrice the smallest packet. Accordingly, during the next cell (packet) time, defined by the ratio of P to the smallest packet, packet segments stored in banks number 1 and 2 of input buffer $210_1$ as well as packet segments stored in banks number 1, 2, and 3 of input buffer $210_4$ are transferred to shared memory 220.

Each packet is stored across the memory depth occupying one or more bits of each word of memory 220. In other words, stored in every address of memory 220 is one or more bits associated with each of the input buffers 210. Memory 220 and its operation is described in a paper entitled "A Highly Modular Packet Switch For GB/Rates", by W. E. Denzel, A. P. J. Engbersen, I. Iliadis, an, and G. Karlsson, IBM Research Division, Zurich Research Laboratory, 8803 Ruschlikon, Switzerland, International Switching Symposium, Oct. 25-30, 1992, pp. 236-240, the content of which is incorporated herein by reference in its entirety. Memory 220 has a memory width defined by the following:

$$M \times P_{rate} \times T_{acc} \times 2$$

where M represents the number of cells that the memory can store at any given time, $P_{rate}$ represents the port rate, $T_{acc}$ represents the memory access time. The product of M, $P_{rate}$, and $T_{acc}$ is multiplied by 2 to account for the fact that during each clock cycle, the memory is accessed to perform both a read operation and a write operation. For example, assuming that the port rate is 10 Gb/sec, the memory access time is 2.5 nsec, and the memory is adapted to store 1000 cells, the memory is 50000 bits wide. The memory depth is defined by the cell length as well as the following:

$$P_{rate} \times T_{acc} \times 2$$

For example, assuming that each cell has a length of 100 bytes, and that each addressable memory location is configured to store 50 bits for each cell, the memory depth is (100×8/50)=16. In other words, for the above example, the memory has 16 addressable locations and thus has a depth of 16.

Data transfer from the input buffers $210_i$ to the memory 220 is carried out at N times the input port rate since the data stored in the banks of each such buffer must be written to memory 220 simultaneously during each cell time. The write operations to the input buffers $210_i$ are carried out at the same rate as the input port rate. The write operations to output buffers $230_i$ are carried out at N times the output port rate. The read operations from output buffers $230_i$ is carried out at the same rate as the output port rate. When writing to the memory 220 all ingress buffers and banks must be synchronized so that all packet headers are written to the same address, e.g., the first address in memory 220, and all other corresponding packet segments are stored in the same respective addresses.

Packets stored along the depth of shared memory 220 are retrieved by memory read access controller 225 and, depending on their sizes, are stored in one or more banks of an associated output buffer $230_i$. For example, if a packet destined for output port $235_2$ is 4 times the smallest packet, the four equal segments of that packet are stored in four banks of output buffer $230_2$. If the ratio of a relatively large packet to the smallest packet is N, the transmission time from shared memory 220 to output buffers $230_i$ of N such small packets is equal to the transmission time of one such relatively larger packet.

Figure 6A:
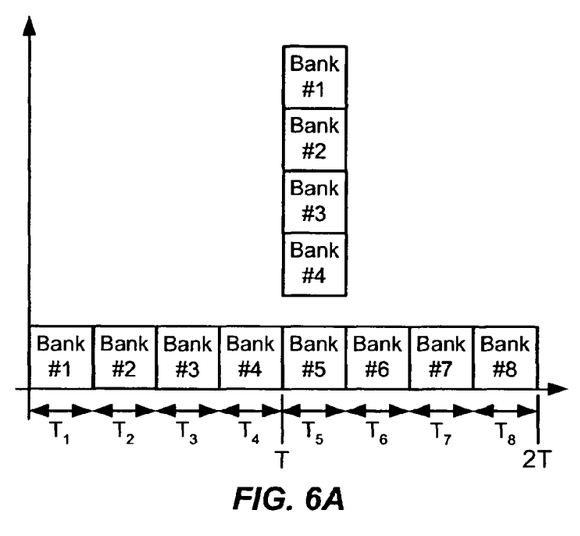
FIG. 6A shows transfer of packet segments from an input buffer banks to the shared memory, in accordance with one embodiment of the present invention.
Figure 6B:
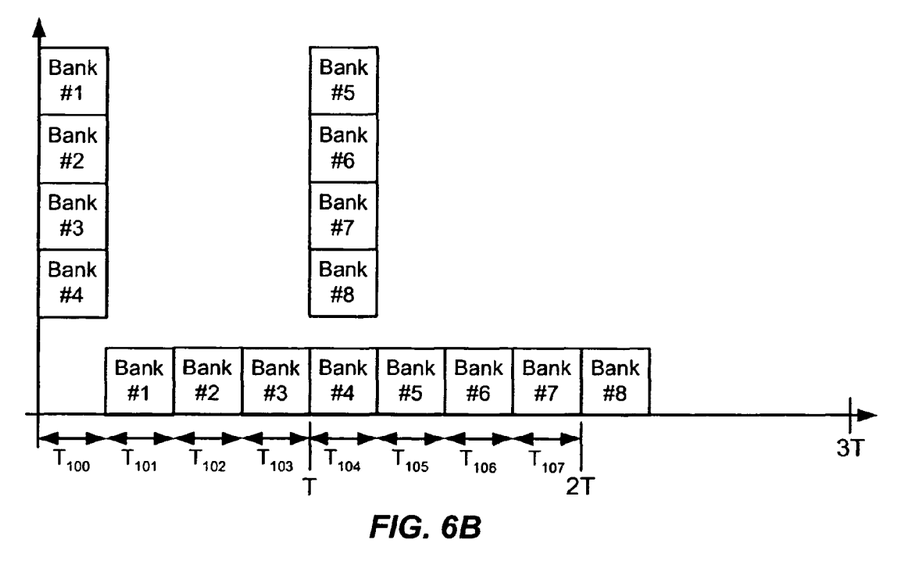
FIG. 6B shows transfer of packet segments from the shared memory to an output buffer, in accordance with one embodiment of the present invention.

FIGS. 6A and 6B respectively show transfer of packet segments from an input buffer banks to the shared memory and transfer of packet segments from the shared memory to an output buffer banks, in accordance with one exemplary embodiment of the present invention. It is assumed that P is four times the smallest packet (i.e., N is 4). In this exemplary embodiment, the maximum number of banks occupied in both the input buffer and the output buffer is N+1. It is further assumed that during each period T, four of the banks of the input buffer are filled.

Referring to FIG. 6A, during cell time $T_1$, the first segment of the packet is shown as being stored in bank number 1 of the input port; during cell time $T_2$, the second segment of the packet is shown as being stored in bank number 2 of the input port; during cell time $T_3$, the third segment of the packet is shown as being stored in bank number 3 of the input port; and during cell time $T_4$, the fourth segment of the packet is shown as being stored in bank number 3 of the input port. During the next cell time $T_5$, the contents of the banks 1-4 are transferred to the shared memory, and concurrently the first segment of the second packet is stored in bank number 5 of the input port. During, the subsequent cell times, the various segments of the second packet are shown as being stored in the banks 1-4 of the input buffer whose contents were previously transferred to the shared memory.

In FIG. 6B, the packet segments are assumed to have been stored in the shared memory in the manner described above in connection with FIG. 6A. The four segments of the packet, shown as being read from the shared memory during cell time $T_{100}$ and loaded in the four banks of the output buffer, are successively read out and delivered to the associated output port during the successive cell transmission times $T_{101}$, $T_{102}$ $T_{103}$ and $T_{104}$. During cell Time $T_{104}$, the four segments of a second packet are shown as being read from the shared memory to be successively transferred during subsequent cell times.

The above embodiments of the present invention are illustrative and not limiting. Various alternatives and equivalents are possible. The invention is not limited by the type or the size of the input/output ports, input buffers, output buffers. Nor is the invention limited to any input or output port rates. The invention is not limited by the rate used to transfer the data. The invention is not limited by any order in which the various bits of the same packet are stored along the memory depth. The invention is not limited by the type of memory shared by the input and output buffers. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A packet switch comprising:
   a plurality of input ports;
   a plurality of output ports;
   a plurality of input buffers, each having a same storage size, each associated with a different one of the plurality of input ports, and each comprising a number of banks as a function of N, wherein N is defined by a ratio of a preselected size to a smallest packet size and wherein N is an integer greater than or equal to one, each bank having a same storage size, and each bank being configured to store a different one of N segments of a packet received by its associated input port;
   a plurality of output buffers, each having a same storage size, each associated with a different one of the plurality of output ports, and each comprising a number of banks as a function of N, each bank having a same storage size, and each bank configured to receive from the memory during each packet transmission time a different segment of a packet destined for an associated output port; and
   a memory configured to store in each of its addressable storage locations a subsegment of each packet stored in each of the input buffers, wherein during each packet transmission period all packets stored in all of the plurality of input buffers are stored in the memory.

2. The packet switch of claim 1 wherein each segment of each packet has a size equal to the storage size of an input buffer bank in which it is stored.

3. The packet switch of claim 1 wherein each segment of a packet received from the memory has a size equal to the storage size of an output buffer bank in which it is stored.

4. The packet switch of claim 1 wherein said subsegment of each packet is a bit.

5. A method of switching packets, the method comprising:
   storing each of N segments of a first received packet in a different one of a number of banks of a first input buffer during a first time period, wherein the number of banks of the first input buffer is defined as a function of N, said N defined by a ratio of a preselected size to a smallest packet size, and wherein N is an integer greater than or equal to one;
   storing each of N segments of a second received packet in a different one of a number of banks of a second input buffer during the first time period, wherein the first input buffer and the second input buffer have a same storage size, wherein the number of banks of the second input buffer is defined as a function of N;
   storing corresponding subsegments of each of the first and second packets in a same addressable storage location of a memory during a second time period until all subsegments of each of the first and second packets are stored in the memory, said second time period being equal to the first time period;
   transferring one or more segments of a third packet stored in the memory to a different one of a number of banks of a first output buffer, wherein the number of banks of the first output buffer is defined as a function of N; and
   transferring one or more segments of a fourth packet stored in the memory to a different one of a number of banks of a second output buffer, wherein the number of banks of the second output buffer is defined as a function of N.

6. The method of claim 5 wherein each segment of each received packet has a size equal to the storage size of an input buffer bank in which it is stored.

7. The method of claim 5 wherein each segment of each packet transferred from the memory has a size equal to the storage size of an output buffer bank in which it is stored.

8. The method of claim 5 wherein said subsegment of each packet is a bit.

9. An apparatus comprising:
   means for storing each of N segments of a first received packet during a first time period, said N defined by a ratio of a preselected size to a smallest packet size, and wherein N is an integer greater than or equal to one, wherein the means for storing each of the N segments of the first received packet comprises a number of banks as a function of N;

means for storing each of N segments of a second received packet during the first time period, wherein the means for storing each of the N segments of the first received packet has a size equal to a size of the means for storing each of the N segments of the second received packet, and wherein the means for storing each of the N segments of the second received packet comprises a number of banks as a function of N;

means for transferring corresponding subsegments of each of the first and second packets in a same addressable storage location of a memory during a second time period until all subsegments of each of the first and second packets are stored in the memory, said second time period being equal to the first time period;

means for storing one or more segments of a third packet during the first time period;

means for transferring out N segments of a fourth packet stored in the memory;

means for transferring out N segments of a fifth packet stored in the memory;

means for storing the transferred out N segments of the fourth packet during a third time period; and means for storing the transferred out N segments of the fifth packet during the third time period, wherein the means for storing the transferred out N segments of the fourth packet has a size equal to the size of the means for storing the transferred out N segments of the fifth packet, and wherein the means for storing the transferred out N segments of the fourth packet has a third N storage means, and the means for storing the transferred out N segments of the fifth packet has a fourth N storage means, wherein each of the third N storage means has a size equal to each of the fourth N storage means.

10. The apparatus of claim 9 wherein each segment of each of the first and second received packets has a size equal to the size of the storage means in which the segment is stored.

11. The apparatus of claim 9 wherein each transferred out segment of each of the third and fourth received packets has a size equal to the size of the storage means in which the transferred out segment is stored.

12. The apparatus of claim 9 wherein each subsegment of each of the first and second packets is a bit.

* * * * *